Dec. 27, 1966  H. H. LUTZMANN ET AL  3,294,882
FILM FORMING METHOD AND APPARATUS
Filed Oct. 24, 1963
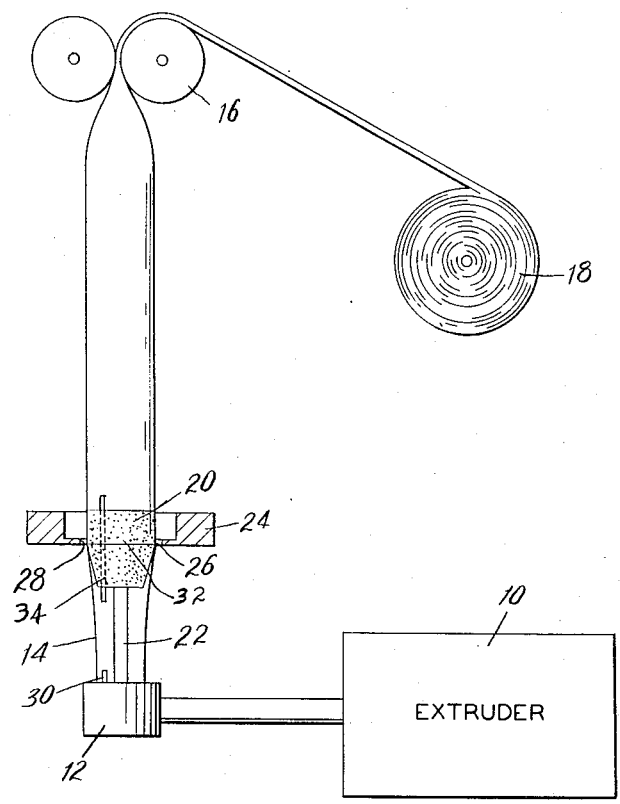
INVENTORS
HANS HARALD LUTZMANN
GARLAND EUGENE RALEY
BY
ATTORNEY

United States Patent Office 3,294,882
Patented Dec. 27, 1966

3,294,882
FILM FORMING METHOD AND APPARATUS
Hans Harald Lutzmann and Garland Eugene Raley, Terre Haute, Ind., assignors to Union Carbide Corporation, a corporation of New York
Filed Oct. 24, 1963, Ser. No. 318,687
12 Claims. (Cl. 264—95)

This invention relates to film forming method and apparatus. More particularly it relates to improvements in such method and apparatus which enable greater production and a product having improved optical properties.

The advent of internally cooled thermoplastic tubing increased film production rates and also provided film products having superior optical and strength properties. This technique first disclosed in U.S. Patent 2,720,680 to M. R. Gerow is advantageous in terms of equipment cost, production rate and product quality.

Other and subsequent patents have indicated a divergence of views among those in the art as to the critical factors in achieving optimum results in internally cooled extrusion. For example, Dyer et al. in U.S. Patent 2,966,700 and Fallwell in U.S. Patent 3,092,874 both stress the importance of the absence of contact between the tubing and the internal cooling means. Kritchever, on the other hand, in U.S. Patent 3,085,293 emphasizes the need for an air-sealing relation between the cooling means and the tubing. Still others in the art e.g., Heisterkamp et al. in U.S. Patent 3,090,998 rely primarily on externally applied cooling fluids to achieve heat transfer and teach the use or not of actual contact between tubing and the internal cooling means.

One of the outstanding characteristics of film formed over a cooling means in accordance with the Gerow patent above mentioned is the high clarity and gloss and low haze of the film product. With polyolefins particularly is this an advantage. Of course optical properties are constantly sought to be improved. Simultaneously increased production rates possible with increased cooling power are always a goal.

It is an object of the present invention to provide method and apparatus for producing thermoplastic film (which term is intended to include tubing and sheeting) having excellent optical and strength properties.

It is another object to provide method and apparatus for more rapid production of film having superior properties.

It is another object to provide method and apparatus requiring minimum down-time in the production of film.

It is another object to provide film cooling means having improved wearing characteristics.

It is another object to obviate problems of volatiles condensation (plate-out) on film products produced over an internal cooling means.

It is still another object to provide means for positively controlling the degree of contact between the film and the cooling means.

It has now been discovered that these and other objects are achieved by passing extruded tubing over a cooling means having a thin adherent coating of high melting point abrasion resistant material on the surface and maintaining said tubing in discontinuous contact therewith. Apparatus is provided comprising a cooling means having a thin adherent coating of high melting point abrasion resistant material comprising a core and extending therefrom a plurality of spaced protuberances.

In the drawings the single figure schematically presents one form of the apparatus of the invention.

In particular, there is provided an improvement in the method of forming thermoplastic film comprising extruding from an annular die thermoplastic tubing in the formative plastic state, and drawing the tubing over a cooling means spaced from the die and positioned interiorly of the tubing to set the tubing which comprises supporting the tubing passing over the cooling means on a thin adherent coating of a high melting point abrasion resistant material having a plurality of spaced protuberances extending laterally from the core of the cooling means and having walls and substantially planar portions or plateaus at the outermost extremities thereof, maintaining the tubing in actual contact with said plateaus of said material, maintaining a layer of air between the tubing and the core of the cooling means and preferably positively engaging portions of the film with the adjacent plateau by the application of a force about the outer periphery of the tubing.

The "formative plastic state" is a condition in which thermoplastic is molten and nonselfsupporting but possesses sufficient mechanical strength to be drawn.

The "core" of the internal cooling means is the central portion of the means from which the protuberances radiate laterally outward. The core surface can be rough or smooth.

It is a primary feature of the present invention that the problems of sticking or inadequate heat transfer which have been characteristic of the other methods of internally cooled extrusion are overcome by the present technique of providing supporting protuberances comprised of the abrasion resistant coating material.

The protuberances are such in extent and spacing on the surface of the core to carry the film off the core surface. Any particular size will of course depend on the spacing and frequency of the protuberances and the relative stiffness and hardness of the film and certain environmental factors such as an external air blast which is described below. In general, the protuberances will extend from 50 to 150 microinches.

The composition of the proturberances is not narrowly critical in terms of supporting the film, but for practical economic reasons the composition should be long wearing.

The hard, metal oxides, nitrides, and carbides, particularly abrasive materials such as tungsten carbide, titania, alumina and chrome oxides, boron nitride, chromium carbide, nickel carbide, and the like, and mixtures thereof when formed into protuberant coatings provide long wearing cooling means surfaces.

In general, any abrasion resistant material will form an effective surface for the cooling means of the present invention. These materials can be coated on a metal substrate at thicknesses of for example, 0.2 to 75 mils or thicker by a variety of means including flame spray coating techniques such as described in United States Patent 2,714,563 to Poorman et al. An irregular surface is most desirable. Prior to use the coating is abraded as with emery paper to reduce the sharp edged peaks of the abrasion resistant coating to a flat or other curvilinear configuration or until film can be passed over the coating without scratching. Herein such curvilinear surfaces on protuberances are termed plateaus.

The present invention is particularly suited to the extrusion of polyolefin film e.g., polyethylene, polypropylene, and the like, i.e., polymers of olefins having from 2 to 12 carbon atoms. All the thermoplastics, however, can be made into film by the present method, including for example, polystyrene and poly(vinyl chloride).

Referring now to the drawing there is shown a film extrusion apparatus according to one embodiment of the present invention. Thermoplastic material is reduced to a flowing condition in extruder 10 and extruded out of annular die 12. While the figure illustrtaes upward vertical extrusion the direction is not critical and can be downward vertical or at some angle from vertical. The tubing 14 issuing from die 12 is drawn upwardly by pinch rolls 16 and then is led to wind-up roll 18. If desired, the tubing can be slit and wound upon one or more rolls. The tubing 14 comprises thermoplastic in the formative plastic state from the lip of die 12 to an area of cooling means 20. The cooling means 20 is supported from the die 12 by pipe 22. The tubing 14 passes over and around the cooling means 20 which is thus positioned interiorly of the tubing. The cooling means is generally circular in cross-section, e.g., circular, elliptical and the like, but can be provided with other shapes as desired. The cooling means 20 is coated with abrasive having a plurality of protuberances 32.

The cooling means 20 is generally of gradually increasing diameter in the direction of flow to the line of tubing impingement during normal operation and of gradually reducing diameter thereafter, to facilitate start-up. A pressure equalizing tube 34 is provided in the cooling means 20. The constructional and operational details of the extrusion cooling means and take-off means are now well known and reference is made to U.S. Patent 2,760,680, U.S. Patent 3,061,875 and U.S. Patent 3,084,386 all to M. R. Gerow and other patents above mentioned which are herewith incorporated by reference.

In general, the improvement of the present invention comprises providing a controlled gaseous fluid layer between the tubing 14 and the cooling means 20 by the introduction of air or other gaseous fluid at a pressure just sufficient to support the tubing between the die 12 and the cooling means 20. The volume of fluid introduced at 30 is conrtolled to provide a flow of air over the surface of cooling means 20 between spaced protuberance and not sufficient to lift the film from the plateaus with which the film is in sliding contact.

In a preferred embodiment apparatus is provided for positively engaging the tubing 14 with the plateaus of protuberances 32 such as a circumferential fluid directing means, ring 24 connected to appropriate fluid sources (not shown) such as water or preferably air or a solid ring or rolls can be used to cause the tubing to bear against the protuberant plateaus. The temperature of the fluid will generally be below that of the film on which the fluid impinges at the points constituting the peripheral line of impingement, generally indicated at 26. There exists a "frost line" on the tubing, a dividing line between thermoplastic in the formative plastic state and set thermoplastic. The peripheral line of impingement 26 is normally below the frost line so as to be a more effective aid in cooling the tubing. A narrow line of impingement is preferred such as is obtained with small fluid discharge openings such as shown at 28.

The following example is illustrative of the present invention.

A thin adherent coating of tungsten carbide typically is placed on a cooling former by feeding finely powdered (mostly 10 to 40 microns particle size) cast tungsten carbide composition at a rate of about 10 to 15 pounds per hour to a gun about five feet long and one-inch inside diameter such as described in U.S. Patent 2,714,563 above referred to. Acetylene and oxygen are fed in a ratio of about one cubic foot of the former to one to two cubic feet of the latter at an average rate of about 360 cubic feet per hour of the mixture. The average flow of nitrogen is about 180 cubic feet per hour. The ignition frequency is about four per second. A clean iron, aluminum or steel surface preferably roughened as by grit blasting is positioned about three inches from the open end of the gun. A dense, adherent layer of tungsten carbide composition is deposited at a rate of about one square inch per minute. Thickness can be varied by changing the duration of application.

The detonation gun deposits of tungsten carbide are fine grained dense, lamellar structures composed of mixed layers of tungsten carbide (WC) complex carbides of cobalt and tungsten (where cobalt is present) and small amounts of a secondary tungsten carbide ($W_2$). The particles which constitute the coating are elongated and flattened by the heat and impact imparted by the gun into overlapping discs or leaves such that their diameter is many times their thickness.

The coating has a bulk density substantially identical with that of the solid cast material, e.g., 14.5 g./cc. Porosity is less tan 1%. Adherence of the coating to the base is excellent, as shown by the fact that portions may be ground down to and through the interface without peeling. The hardness on the Vickers scale is above 1100.

EXAMPLE

Two films were prepared. Control I was prepared from low density commercial polyethylene by blown tube extrusion. The example film was prepared on equipment such as shown in the drawing at 236#/hour from the composition of the control by the method of this invention employing a tungsten carbide coated cooling means prepared as above described and using a blast of ambient air against upwardly extruded film passing over a mandrel maintained at 65° F. Results are summarized in the table. Included also are typical values for presently available commercial films (Products I and II).

[Film properties (1.25 mils)]

|  | Product I | Product II | Control | Example |
| --- | --- | --- | --- | --- |
| Haze | 3.3 | 5.3 | 5.0 | 2.8 |
| Gloss | 77 | 67 | 68 | 82 |
| Impact, g | 63 | 63 | 64 | 87 |
| Modulus: |  |  |  |  |
| MD | 18,000 | 24,800 | 23,600 | 17,500 |
| TD | 17,400 | 29,300 | 28,900 | 17,400 |
| Line Speed, f.p.m |  |  | 62 | 195 |

It will be noted from a consideration of the table that the method of this invention provides film superior in haze and gloss i.e., the film has superior optical properties. Moreover the strength properties are superior in terms of impact strength and remarkably uniform in terms of machine direction (MD) and transverse direction (TD) modulus. A further surprising feature is the extrusion speed which in this example is triple the speed of the control.

What is claimed is:

1. Method for the production of thermoplastic tubing comprising extruding from an annular die thermoplastic tubing in the formative plastic state, drawing the tubing over a cooling means spaced from the die and positioned interiorly of the tubing, supporting the tubing passing over the cooling means having a thin adherent coating of abrasion resistant material with a plurality of spaced protuberances extending laterally from the core of the cooling means and having walls and plateaus of a size and number sufficient to carry said tubing off the core, maintaining the tubing in actual contact with said plateaus and maintaining a layer of air between the tubing and the core of the cooling means.

2. Method claimed in claim 1 wherein the tubing and the plateaus are caused to positively contact by application of force to the outer periphery of the tubing.

3. Method claimed in claim 2 wherein the application of force is by an air blast from a circumferential air ring.

4. Method claimed in claim 3 wherein the air blast is at ambient temperatures.

5. Method claimed in claim 1 wherein the tubing is polyethylene.

6. Method claimed in claim 1 wherein the tubing is polypropylene.

7. Method claimed in claim 1 wherein the tubing is polystyrene.

8. In apparatus for the production of thermoplastic film comprising an extruder, an annular die and wind-up means and a cooling means over which the film passes spaced from the die, and positioned interiorly of the tubing, the improvement which comprises having as the film contacting surface of the cooling means a thin adherent coating of abrasion resistant material having a plurality of protuberances extending laterally outward from said surface and having walls and at the extremities thereof plateaus spaced to support film passing in sliding contact thereover off the surface of said cooling means and means to provide a flow of fluid over the surface of the cooling means between the protuberances.

9. Apparatus claimed in claim 8 wherein a fluid directing means is positioned circumferentially about the cooling means.

10. Apparatus claimed in claim 8 wherein the protuberances comprise an abrasive material.

11. Apparatus claimed in claim 10 wherein the protuberances comprise tungsten carbide.

12. Apparatus claimed in claim 11 wherein the protuberances extend from 50 to 150 microinches.

References Cited by the Examiner

UNITED STATES PATENTS

| | | | |
|---|---|---|---|
| 3,061,875 | 11/1962 | Gerow | 264—95 |
| 3,061,940 | 11/1962 | Cichelli. | |
| 3,090,991 | 5/1963 | Hathaway. | |
| 3,142,865 | 8/1964 | Richie et al. | 18—14 X |
| 3,144,494 | 8/1964 | Gerow. | |
| 3,201,827 | 8/1965 | Reynolds et al. | |

ROBERT F. WHITE, *Primary Examiner.*

L. S. SQUIRES, *Assistant Examiner.*